United States Patent
Peerlings et al.

(10) Patent No.: US 7,160,974 B2
(45) Date of Patent: *Jan. 9, 2007

(54) THERMOPLASTICALLY PROCESSABLE POLYURETHANES (TPU) WITH SELF-EXTINGUISHING PROPERTIES, A PROCESS FOR THEIR PREPARATION AND THEIR USE

(75) Inventors: Henricus Peerlings, Solingen (DE); Wolfgang Bräuer, Leverkusen (DE); Hans-Georg Wussow, Düsseldorf (DE); Juergen Winkler, Langenfeld (DE); Hans-Georg Hoppe, Leichlingen (DE)

(73) Assignee: Bayer MaterialScience AG, Leverkusen (DE)

( * ) Notice: Subject to any disclaimer, the term of this patent is extended or adjusted under 35 U.S.C. 154(b) by 156 days.

This patent is subject to a terminal disclaimer.

(21) Appl. No.: 10/642,984

(22) Filed: Aug. 18, 2003

(65) Prior Publication Data
US 2004/0039147 A1    Feb. 26, 2004

(30) Foreign Application Priority Data
Aug. 21, 2002  (DE) ............... 102 38 111

(51) Int. Cl.
C08G 18/10 (2006.01)
C08G 18/38 (2006.01)
C08G 18/48 (2006.01)
C08G 18/50 (2006.01)
C08G 18/76 (2006.01)

(52) U.S. Cl. ............. 528/60; 528/61; 528/65; 528/66; 528/72; 528/76

(58) Field of Classification Search ......... 528/60, 528/61, 65, 66, 72, 76
See application file for complete search history.

(56) References Cited

U.S. PATENT DOCUMENTS

| 3,385,801 | A | | 5/1968 | Birum et al. ............... 260/2.5 |
|---|---|---|---|---|
| 3,474,047 | A | * | 10/1969 | Pelletier et al. ............ 521/169 |
| 3,609,107 | A | * | 9/1971 | Boyer et al. ............... 521/168 |
| 3,741,919 | A | * | 6/1973 | Lewis ...................... 521/169 |
| 4,052,487 | A | | 10/1977 | Sturtz et al. ............... 260/945 |
| 4,102,830 | A | | 7/1978 | Sturtz et al. ............... 521/165 |
| 4,298,709 | A | * | 11/1981 | Ginter et al. .............. 521/169 |
| 4,343,914 | A | * | 8/1982 | Lee ......................... 521/168 |
| 4,371,684 | A | * | 2/1983 | Quiring et al. .............. 528/65 |
| 4,555,562 | A | * | 11/1985 | Lee et al. ................... 528/72 |
| 5,110,850 | A | | 5/1992 | Farkas ..................... 524/100 |
| 5,391,583 | A | * | 2/1995 | Blount ..................... 521/185 |
| 5,837,760 | A | | 11/1998 | Hackl et al. ............... 524/127 |
| 6,534,617 | B1 | * | 3/2003 | Batt et al. ................... 528/65 |
| 2001/0053841 | A1 | * | 12/2001 | Kaufhold et al. ............ 528/48 |

FOREIGN PATENT DOCUMENTS

| DE | 1 964 834 | 7/1971 |
|---|---|---|
| EP | 0 122 894 | 3/1984 |
| GB | 1057018 | 2/1967 |
| GB | 1122545 | 8/1968 |

OTHER PUBLICATIONS

Chemical Abstracts, Bd. 89, Nr. 14, 14. Oktober 1978 (Oct. 14, 1978), Columbus, Ohio, US; Abstract No. 111237q, "Self-extinguishing polyurethanes" Seite 67 Spalte 1 XP002263728, Zusammenfasung & SU 576 763 A (Institute Of The Chemistry Of High-Molecular Weight Compounds) 5. Juni 1978 (Jun. 5, 1978).
Chemical Abstracts, Bd. 124, Nr. 24, 10 Juni 1996 (Jun. 10, 1996), Columbus, Ohio, US; Abstract No. 318045n, "Synthesis and characterization of phosphorus containing segmented Polyurethanes" Seite 11, XP0000665523 Zusammenfassung & Oing et al: Polym. Prepr., Bd. 37, Nr. 1, 1996, Seiten 579-580.

* cited by examiner

*Primary Examiner*—Rabon Sergent
(74) *Attorney, Agent, or Firm*—Joseph C. Gil; Lyndanne M. Whalen; N. Denise Brown

(57) ABSTRACT

The present invention relates to thermoplastically processable polyurethane elastomers (TPU) with tensile strengths of >35 MPa (measured in accordance with EN ISO 527-3), with shrinkages of <3% and with self-extinguishing properties based on the use of at least one flameproofing agent which can be built in, a process for their preparation and their use.

6 Claims, No Drawings

THERMOPLASTICALLY PROCESSABLE POLYURETHANES (TPU) WITH SELF-EXTINGUISHING PROPERTIES, A PROCESS FOR THEIR PREPARATION AND THEIR USE

BACKGROUND OF THE INVENTION

The present invention relates to thermoplastically processable polyurethane elastomers (TPU) with self-extinguishing properties, a process for their preparation and their use.

Thermoplastic polyurethanes (TPU) are of great industrial importance because of their good elastomer properties and thermoplastic processability. An overview of the preparation, properties and uses of TPUs is given e.g. in Kunststoff Handbuch [G. Becker, D. Braun], volume 7 "Polyurethane", Munich, Vienna, Carl Hanser Verlag, 1983.

TPUs are usually built up from linear polyols (macrodiols), such as polyester-, polyether- or polycarbonate-diols, organic diisocyanates and short-chain, usually difunctional alcohols (i.e. chain lengtheners). They can be prepared continuously or discontinuously. The best known preparation processes are the belt process (see, for example, GB-A 1 057 018) and the extruder process (see, for example, DE-A 19 64 834).

Thermoplastically processable polyurethane elastomers can be built up either stepwise (e.g. by the prepolymer metering process) or by simultaneous reaction of all the components in one stage (e.g. by the one-shot metering process).

To achieve a good flame resistance in polymers, various types of additives can be employed. Halogen-containing materials, inorganic fillers or organic phosphorus compounds or mixtures thereof are often employed for this. An overview of the use of flameproofing agents in polymers is given e.g. in H. Zweifel, Plastics Additives Handbook, 5th ed., Hanser Verlag Munich, 2001, chapter 12; J. Green, J. of Fire Sciences, 1997, 15, p. 52–67 or Kirk-Othmer Encyclopedia of Chemical Technology, 4th ed., vol. 10, John Wiley & Sons, New York, p. 930–998.

Various substances or mixtures thereof are possible as flameproofing agents in thermoplastically processable polyurethane elastomers (TPUs).

European Patent (B) 0 508 072 describes the use of melamine in amounts of 30 to 40 wt. % as a flameproofing agent in TPU. The TPU treated in this way has a tensile strength of 15 MPa and is rated with UL-94 V-0.

The application WO 00/66658 and EP-B 617 079 describe combinations of phosphates, phosphonates and/or derivatives thereof in combination with melamine cyanurate. The corresponding TPUs have tensile strengths of ≦35 MPa and the flameproofing is rated with UL-94 V-0.

The sharply decreasing level of mechanical properties, caused by the necessary high amounts used, has proven to be a problem in the use of inorganic-based flameproofing agents or of melamine derivatives. An undesirable migration of the organic derivatives employed, e.g. the phosphates or phosphonates, is also observed.

The object of the present invention was therefore to provide thermoplastically processable polyurethane elastomers (TPUs) which are self-extinguishing, and simultaneously exhibit a low shrinkage and a high tensile strength, and show no or only slight blooming effects.

It has been possible to achieve this object by building into the TPU, via the so-called prepolymer process, certain phosphorus-containing compounds which can be built in.

Diol-phosphonates as flameproofing agents which can be built in are known in the field of polyurethane foams and described in DE-C 25 20 180. With these flameproofing agents thermoplastic polyurethanes are obtained which have too high shrinkages.

SUMMARY OF THE INVENTION

The invention provides thermoplastically processable polyurethane elastomers (TPUs) with tensile strengths of greater than 35 MPa (measured in accordance with EN ISO 527-3), with shrinkages of less than 3% and with self-extinguishing properties. These TPUs comprise the reaction product of:

(1) a prepolymer containing NCO groups and which comprises the reaction product of:

A) at least one organic diisocyanate,
  and
  B) at least one polyol having on average at least 1.8 and not more than 3.0 Zerewitinoff-active hydrogen atoms and a number-average molecular weight $\overline{M}_n$ of 450 to 10,000;

with

C) at least one low molecular weight polyol or polyamine having on average at least 1.8 and not more than 3.0 Zerewitinoff-active hydrogen atoms and a number-average molecular weight $\overline{M}_n$ of 60 to 400 as a chain lengthener;

and

D) from 1 to 15 wt. %, based on the total weight of the TPU, of at least one organic phosphorus-containing compound based on phosphonate or phosphine oxide having on average at least 1.5 and not more than 3.0 Zerewitinoff-active hydrogen atoms and a number-average molecular weight $\overline{M}_n$ of 60 to 10,000, corresponding to the following structural formula:

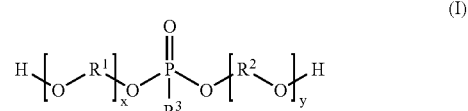

(I)

wherein:

$R^1$ and $R^2$: may be the same or different, and each independently represents a branched or unbranched alkylene radical having 1 to 24 carbon atoms, a substituted or unsubstituted arylene radical having 6 to 20 carbon atoms, a substituted or unsubstituted aralkylene radical having 6 to 30 carbon atoms, or a substituted or unsubstituted alkarylene radical having 6 to 30 carbon atoms;

$R^3$: represents a hydrogen atom, a branched or unbranched alkyl radical having 1 to 24 carbon atoms, a substituted or unsubstituted aryl radical having 6 to 20 carbon atoms, a substituted or unsubstituted aralkyl radical having 6 to 30 carbon atoms, or a substituted or unsubstituted alkaryl radical having 6 to 30 carbon atoms;

and x and y each independently represents a number from 1 to 50,

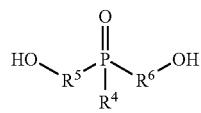

(II)

wherein:
- R⁴: represents a hydrogen atom, a branched or unbranched alkyl radical having 1 to 24 carbon atoms, a substituted or unsubstituted aryl radical having 6 to 20 carbon atoms, a substituted or unsubstituted aralkyl radical having 6 to 30 carbon atoms, or a substituted or unsubstituted alkaryl radical having 6 to 30 carbon atoms;
- R⁵ and R⁶: may be the same or different, and each independently represents a branched or unbranched alkylene radical having 1 to 24 carbon atoms, a substituted or unsubstituted arylene radical having 6 to 20 carbon atoms, a substituted or unsubstituted aralkylene radical having 6 to 30 carbon atoms, or a substituted or unsubstituted alkarylene radical having 6 to 30 carbon atoms;

and, optionally, in the presence of:
E) one or more catalysts;
F) from 0 to 70 wt. %, based on the total weight of the TPU, of at least one further flameproofing agent which contains no Zerewitinoff-active hydrogen atoms and has a number-average molecular weight $\overline{M}_n$ of 60 to 10,000;

and
G) 0 to 20 wt. %, based on the total weight of the TPU, of further auxiliary substances and additives, wherein the Isocyanate Index ranges from 85 to 120.

As used herein, the term Isocyanate Index represents the characteristic number of the system. The Isocyanate Index is the quotient, multiplied by 100, of the equivalent ratios of the isocyanate groups from component A), and the sum of the Zerewitinoff-active hydrogen atoms of components B), C) and D). A suitable Isocyanate Index for the present invention ranges from 85 to 120.

Although it is possible, at least theoretically, to use the same compound as polyol B) and as component D) and the same compound as chain lengthening agent C) and as component D), these compounds are different in actual use.

Suitable organic diisocyanates to be used as component A) herein include the aliphatic, cycloaliphatic, araliphatic, aromatic and heterocyclic diisocyanates or any desired mixtures of these diisocyanates (cf. HOUBEN-WEYL "Methoden der organischen Chemie", volume E20 "Macromolekulare Stoffe", Georg Thieme Verlag, Stuttgart, New York 1987, p. 1587–1593 or Justus Liebigs Annalen der Chemie, 562, pages 75 to 136).

Some specific examples which may be mentioned in detail include aliphatic diisocyanates such as, for example, ethylene-diisocyanate, 1,4-tetramethylene-diisocyanate, 1,6-hexamethylene-diisocyanate and 1,12-dodecane-diisocyanate; cycloaliphatic diisocyanates such as, for example, isophorone-diisocyanate, 1,4-cyclohexane-diisocyanate, 1-methyl-2,4-cyclohexane-diisocyanate and 1-methyl-2,6-cyclohexane-diisocyanate and the corresponding isomer mixtures, 4,4'-dicyclohexylmethane-diisocyanate, 2,4'-dicyclohexylmethane-diisocyanate and 2,2'-dicyclohexylmethane-diisocyanate and the corresponding isomer mixtures; and furthermore aromatic diisocyanates such as, for example, 2,4-toluylene-diisocyanate, mixtures of 2,4-toluylene-diisocyanate and 2,6-toluylene-diisocyanate, 4,4'-diphenylmethane-diisocyanate, 2,4'-diphenyl-methane-diisocyanate and 2,2'-diphenylmethane-diisocyanate, mixtures of 2,4'-diphenylmethane-diisocyanate and 4,4'-diphenylmethane-diisocyanate, urethane-modified liquid 4,4'-diphenylmethane-diisocyanates or 2,4'-diphenylmethane-diisocyanates, 4,4'-diisocyanato-1,2-diphenylethane and 1,5-naphthylene-diisocyanate. In the present invention, it is preferred that 1,6-hexamethylene-diisocyanate, 1,4-cyclohexane-diisocyanate, isophorone-diisocyanate, dicyclohexylmethane-diisocyanate and diphenylmethane-diisocyanate isomer mixtures with a 4,4'-diphenylmethane-diisocyanate content of more than 96 wt. % are used, and 4,4'-diphenylmethane-diisocyanate and 1,5-naphthylene-diisocyanate are preferably used. The diisocyanates mentioned can be used individually or in the form of mixtures with one another. They can also be used together with up to 15 mol % (calculated for the total diisocyanate) of a polyisocyanate, but polyisocyanate may be added at the most in an amount such that a product which is still thermoplastically processable is formed. Examples of such polyisocyanates include triphenylmethane-4,4',4"-triisocyanate and polyphenylpolymethylene-polyisocyanates.

Zerewitinoff-active polyols which are suitable to be used as component B) in the products of the present invention are those having on average at least 1.8 to not more than 3.0 Zerewitinoff-active hydrogen atoms and a number-average molecular weight $\overline{M}_n$ of 450 to 10,000. These often contain small amounts of non-linear compounds as a result of their production. Thus, these are often referred to as "substantially linear polyols". Polyester-, polyether- or polycarbonate-diols or mixtures of these are preferred.

In addition to compounds containing amino groups, thiol groups or carboxyl groups, compounds containing two to three, preferably two hydroxyl groups are included, and in particular, specifically those with number-average molecular weights $\overline{M}_n$ of 450 to 6,000. It is particularly preferred that these have a number-average molecular weight $\overline{M}_n$ of 600 to 4,500. Among the preferred compounds are, for example, polyesters, polyethers, polycarbonates and polyester-amides containing hydroxyl groups.

Suitable polyether-diols to be used as component B) of the invention can be prepared, for example, by reacting one or more alkylene oxides having 2 to 4 carbon atoms in the alkylene radical with a starter molecule which contains two active hydrogen atoms in bonded form. Alkylene oxides which may be mentioned include, e.g. ethylene oxide, 1,2-propylene oxide, epichlorohydrin and 1,2-butylene oxide and 2,3-butylene oxide. Ethylene oxide, propylene oxide and mixtures of 1,2-propylene oxide and ethylene oxide are preferably used. The alkylene oxides can be used individually, alternately in succession or as mixtures. Possible starter molecules include, for example, water, amino alcohols, such as N-alkyl-diethanolamines, for example N-methyl-diethanolamine, and diols, such as ethylene glycol, 1,3-propylene glycol, 1,4-butanediol and 1,6-hexanediol. Mixtures of starter molecules can also optionally be employed. Suitable polyether-ols are furthermore the polymerization products of tetrahydrofuran which contain hydroxyl groups. It is also possible to employ trifunctional polyethers in amounts of 0 to 30 wt. %, based on the weight of the bifunctional polyethers. The amount of the trifunctional polyethers used is limited to an amount such that a product which is still thermoplastically processable is formed. The substantially linear polyether-diols preferably have number-average molecular weights $\overline{M}_n$ of 450 to 6,000. They can be used either individually or in the form of mixtures with one another.

Suitable polyester-diols to be used as component B) in the present invention can be prepared, for example, from dicarboxylic acids having 2 to 12 carbon atoms, preferably 4 to 6 carbon atoms, and polyhydric alcohols. Possible dicarboxylic acids include, for example: aliphatic dicarboxylic acids, such as succinic acid, glutaric acid, adipic acid, suberic acid, azelaic acid and sebacic acid, or aromatic dicarboxylic acids, such as phthalic acid, isophthalic acid and terephthalic acid. The dicarboxylic acids can be used individually or as mixtures, e.g. in the form of a succinic, glutaric and adipic acid mixture. For the preparation of the polyester-diols it may be advantageous, where appropriate, to use the corresponding dicarboxylic acid derivatives, such as carboxylic acid diesters having 1 to 4 carbon atoms in the alcohol radical, carboxylic acid anhydrides or carboxylic acid chlorides, instead of the dicarboxylic acids. Examples of suitable polyhydric alcohols include glycols having 2 to 10, preferably 2 to 6 carbon atoms, such as, e.g. ethylene glycol, diethylene glycol, 1,4-butanediol, 1,5-pentanediol, 1,6-hexanediol, 1,10-decanediol, 2,2-dimethyl- 1,3-propanediol, 1,3-propanediol or dipropylene glycol. The polyhydric alcohols can be used by themselves or as a mixture with one another, depending on the desired properties. Compounds which are also suitable for use as component B) include esters of carbonic acid with the diols mentioned, and particularly those diols having 4 to 6 carbon atoms, such as 1,4-butanediol or 1,6-hexanediol, condensation products of ω-hydroxycarboxylic acids, such as ω-hydroxycaproic acid, or polymerization products of lactones, such as, e.g. ω-caprolactones which are optionally substituted. Polyester-diols which are preferably used are ethanediol polyadipates, 1,4-butanediol polyadipates, ethanediol- 1,4-butanediol polyadipates, 1,6-hexanediol-neopentylglycol polyadipates, 1,6-hexanediol- 1,4-butanediol polyadipates and polycaprolactones. The polyester-diols have number-average molecular weights $\overline{M}_n$ of 450 to 10,000 and can be used individually or in the form of mixtures with one another.

Zerewitinoff-active polyols suitable to be used as component C) of the present invention include the so-called chain-lengthening agents, and have on average 1,8 to 3.0 Zerewitinoff-active hydrogen atoms and have a (number average) molecular weight of 60 to 400. These are understood as meaning, in addition to compounds containing amino groups, thiol groups or carboxyl groups, those compounds having two to three, and preferably two hydroxyl groups.

Chain-lengthening agents which are preferably employed in the present invention include aliphatic diols having 2 to 14 carbon atoms, such as e.g. ethanediol, 1,2-propanediol, 1,3-propanediol, 1,4-butanediol, 2,3-butanediol, 1,5-pentanediol, 1,6-hexanediol, diethylene glycol and dipropylene glycol. However, diesters of terephthalic acid with glycols having 2 to 4 carbon atoms, such as e.g. terephthalic acid bis-ethylene glycol or terephthalic acid bis-1,4-butanediol, hydroxyalkylene ethers of hydroquinone, such as e.g. 1,4-di(β-hydroxyethyl)-hydroquinone, ethoxylated bisphenols, such as e.g. 1,4-di(β-hydroxyethyl)-bisphenol A, (cyclo) aliphatic diamines, such as e.g. isophoronediamine, ethylenediamine, 1,2-propylenediamine, 1,3-propylenediamine, N-methyl-propylene-1,3-diamine and N,N'-dimethylethylenediamine, and aromatic diamines, such as e.g. 2,4-toluylenediamine, 2,6-toluylenediamine, 3,5-diethyl-2,4-toluylenediamine or 3,5-diethyl-2,6-toluylenediamine or primary mono-, di-, tri- or tetraalkyl-substituted 4,4'-diaminodiphenylmethanes, are also suitable. Ethanediol, 1,4-butanediol, 1,6-hexanediol, 1,4-di(β-hydroxyethyl)-hydroquinone or 1,4-di(β-hydroxyethyl)-bisphenol A are particularly preferably used as chain lengtheners. Mixtures of the abovementioned chain lengtheners can also be employed. In addition, relatively small amounts of triols can also be added.

Compounds which are monofunctional with respect to isocyanates can be employed as so-called chain terminators. These chain terminators may be present in amounts of up to 2 wt. %, based on the total weight of the TPU. Suitable compounds are e.g. monoamines, such as butyl- and dibutylamine, octylamine, stearylamine, N-methylstearylamine, pyrrolidine, piperidine or cyclohexylamine, and monoalcohols, such as butanol, 2-ethylhexanol, octanol, dodecanol, stearyl alcohol, the various amyl alcohols, cyclohexanol and ethylene glycol monomethyl ether.

The flameproofing agents, which are suitable to be used as component D) in the present invention, have on average at least 1.5 and not more than 3.0, preferably 1.8 to 2.5, particularly preferably 2 Zerewitinoff-active hydrogen atoms. These Zerewitinoff-active hydrogen atoms are preferably based on alcohol or amine.

The flameproofing agents D) have a number-average molecular weight $\overline{M}_n$ of 60 to 10,000, preferably 100 to 5,000, particularly preferably 100 to 1,000.

The flameproofing agents D) are preferably based on phosphonate or phosphine oxide.

Compounds which are preferably employed as a phosphonate are those which correspond to the general formula (I)

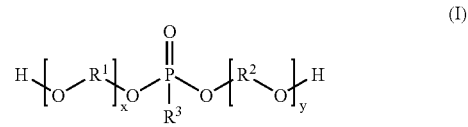

wherein:

R¹ and R²: may be the same or different, and each independently represents a branched or unbranched alkylene radical having 1 to 24 carbon atoms, a substituted or unsubstituted arylene radical having 6 to 20 carbon atoms, a substituted or unsubstituted aralkylene radical having 6 to 30 carbon atoms, or a substituted or unsubstituted alkarylene radical having 6 to 30 carbon atoms;

R³: represents a hydrogen atom, a branched or unbranched alkyl radical having 1 to 24 carbon atoms, a substituted or unsubstituted aryl radical having 6 to 20 carbon atoms, a substituted or unsubstituted aralkyl radical having 6 to 30 carbon atoms, or a substituted or unsubstituted alkaryl radical having 6 to 30 carbon atoms;

and x and y each independently represents a number from 1 to 50.

Compounds which are preferably employed as a phosphine oxide are those which correspond to the general formula (II):

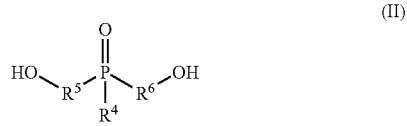

wherein:
- $R^4$: represents a hydrogen atom, a branched or unbranched alkyl radical having 1 to 24 carbon atoms, a substituted or unsubstituted aryl radical having 6 to 20 carbon atoms, a substituted or unsubstituted aralkyl radical having 6 to 30 carbon atoms, or a substituted or unsubstituted alkaryl radical having 6 to 30 carbon atoms;
- $R^5$ and $R^6$: may be the same or different, and each independently represents a branched or unbranched alkylene radical having 1 to 24 carbon atoms, a substituted or unsubstituted arylene radical having 6 to 20 carbon atoms, a substituted or unsubstituted aralkylene radical having 6 to 30 carbon atoms, or a substituted or unsubstituted alkarylene radical having 6 to 30 carbon atoms.
- $R^2$ and $R^3$: may be the same or different, and each independently represents a branched or unbranched alkylene radical having 1 to 24 carbon atoms, a substituted or unsubstituted arylene radical having 6 to 20 carbon atoms, a substituted or unsubstituted aralkylene radical having 6 to 30 carbon atoms, or a sustituted or unsubstituted alkarylene radical having 6 to 30 carbon atoms.

The flameproofing agents, component D) of the present invention, are preferably employed in an amount of 1 to 15, particularly preferably 1 to 10 wt. %, based on the total weight of the TPU.

The flameproofing agents known from the prior art can be employed as flameproofing agents, i.e. component F) of the present invention. These flameproofing agents are described in, e.g. H. Zweifel, Plastics Additives Handbook 5th ed., Hanser Verlag Munich, 2001, chapter 12; J. Green, J. of Fire Sciences, 1997, 15, p. 52–67 or Kirk-Othmer Encyclopedia of Chemical Technology, 4th ed., vol. 10, John Wiley & Sons, New York, p. 930–998.

The relative amounts of components B), C) and D) are preferably chosen such that the ratio of the sum of isocyanate (NCO) groups in component A) to the sum of Zerewitinoff-active hydrogen atoms in components B), C) and D) is from 0.85:1 to 1.2:1, preferably 0.95:1 to 1.1:1.

The thermoplastic polyurethane elastomers according to the invention may contain G) up to a maximum of 20 wt. %, based on the total weight of the TPU, of the conventional auxiliary substances and additives. Typical auxiliary substances and additives include lubricants and mold release agents, such as fatty acid esters, metal soaps thereof, fatty acid amides, fatty acid ester-amides and silicone compounds, antiblocking agents, inhibitors, stabilizers against hydrolysis, light, heat and discoloration, dyestuffs, pigments, inorganic and/or organic fillers, plasticizers, such as phosphates, phthalates, adipates, sebacates and alkylsulfonic acid esters, substances have a fungistatic or bacteriostatic action as well as fillers and mixtures thereof and reinforcing agents. Reinforcing agents include, specifically, fibrous reinforcing substances, such as e.g. inorganic fibers, which are prepared according to the prior art and can also be charged with a size. Further details of the auxiliary substances and additives mentioned can be found in the technical literature, for example, the monograph by J. H. Saunders and K. C. Frisch "High Polymers", volume XVI, Polyurethane, part 1 and 2, Verlag Interscience Publishers 1962 and 1964, the Taschenbuch für Kunststoff-Additive by R. Gächter and H. Müller (Hanser Verlag Munich 1990), or DE-A 29 01 774, the disclosure of which is herein incorporated by reference.

Further additives which can be incorporated into the TPU are thermoplastics such as, for example, polycarbonates and acrylonitrile/butadiene/styrene terpolymers, in particular ABS. Other elastomers, such as rubber, ethylene/vinyl acetate copolymers, styrene/butadiene copolymers and other TPU, can also be used.

Suitable catalysts to be used as component E) in accordance with the present invention include the conventional tertiary amines known from the art, such as e.g. triethylamine, dimethylcyclohexylamine, N-methylmorpholine, N,N'-dimethylpiperazine, 2-(dimethylaminoethoxy)ethanol, diazabicyclo[2,2,2]octane and the like, and, preferably, organometallic compounds, such as titanic acid esters, iron compounds, or tin compounds such as, for example, tin diacetate, tin dioctoate, tin dilaurate or the tin-dialkyl salts of aliphatic carboxylic acids, such as dibutyltin diacetate or dibutyltin dilaurate or the like. Preferred catalysts are organometallic compounds, in particular titanic acid esters and compounds of iron and tin. In general, the total amount of catalysts in the TPU according to the invention is from about 0 to 5 wt. %, preferably 0 to 2 wt. %, based on the total weight of the TPU.

The present invention also relates to a process for the preparation of thermoplastically processable polyurethane elastomers (TPU) with tensile strengths of >35 MPa (measured in accordance with EN ISO 527-3), with shrinkages of <3% and with self-extinguishing properties. This process comprises:

(I) preparing a) a prepolymer containing NCO groups by reacting:
  A) at least one organic diisocyanate,
  with
  B) at least one polyol having on average at least 1.8 and not more than 3.0 Zerewitinoff-active hydrogen atoms and a number-average molecular weight $\overline{M}_n$ of 450 to 10,000;

(II) reacting a) said prepolymer with:
  C) at least one low molecular weight polyol or polyamine having on average at least 1.8 and not more than 3.0 Zerewitinoff-active hydrogen atoms and a number-average molecular weight $\overline{M}_n$ of 60 to 400 as a chain lengthener,
  and
  D) from 1 to 15 wt. %, based on the total weight of the TPU, of at least one organic phosphorus-containing compound based on phosphonate or phosphine oxide having on average at least 1.5 and not more than 3.0 Zerewitinoff-active hydrogen atoms and a number-average molecular weight $\overline{M}_n$ of 60 to 10,000, corresponding to the following structural formula:

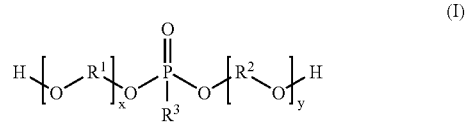

wherein:

R¹ and R¹: may be the same or different, and each independently represents a branched or unbranched alkylene radical having 1 to 24 carbon atoms, a substituted or unsubstituted arylene radical having 6 to 20 carbon atoms, a substituted or unsubstituted aralkylene radical having 6 to 30 carbon atoms, or a substituted or unsubstituted alkarylene radical having 6 to 30 carbon atoms;

R³: represents a hydrogen atom, a branched or unbranched alkyl radical having 1 to 24 carbon atoms, a substituted or unsubstituted aryl radical having 6 to 20 carbon atoms, a substituted or unsubstituted aralkyl radical having 6 to 30 carbon atoms, or a substituted or unsubstituted alkaryl radical having 6 to 30 carbon atoms;

and x and y each independently represents a number from 1 to 50;

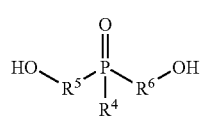

(II)

wherein:

R⁴: represents a hydrogen atom, a branched or unbranched alkyl radical having 1 to 24 carbon atoms, a substituted or unsubstituted aryl radical having 6 to 20 carbon atoms, a substituted or unsubstituted aralkyl radical having 6 to 30 carbon atoms, or a substituted or unsubstituted alkaryl radical having 6 to 30 carbon atoms;

R⁵ and R⁶: may be the same or different, and each independently represents a branched or unbranched alkylene radical having 1 to 24 carbon atoms, a substituted or unsubstituted arylene radical having 6 to 20 carbon atoms, a substituted or unsubstituted aralkylene radical having 6 to 30 carbon atoms, or a substituted or unsubstituted alkarylene radical having 6 to 30 carbon atoms.

R² and R³: may be the same or different, and each independently represents a branched or unbranched alkylene radical having 1 to 24 carbon atoms, a substituted or unsubstituted arylene radical having 6 to 20 carbon atoms, a substituted or unsubstituted aralkylene radical having 6 to 30 carbon atoms, or a substituted or unsubstituted alkarylene radical having 6 to 30 carbon atoms with steps (I) and (II) optionally being carried out in the presence of E) one or more catalysts, and optionally with the addition of:

F) from 0 to 70 wt. %, based on the total weight of the TPU, of at least one further flameproofing agent which contains no Zerewitinoff-active hydrogen atoms and has a number-average molecular weight $\overline{M}_n$ of 60 to 10,000, and G) 0 to 20 wt. %, based on the total weight of the TPU, of further auxiliary substances and additives, wherein the Isocyanate Index is from 85 to 120.

The preparation process according to the invention is preferably carried out as follows:

The process for preparing the TPU can be carried out discontinuously or continuously. The TPU can be prepared continuously, for example, with the mixing head/belt process or the so-called extruder process.

A prepolymer is first prepared from components A) and B), after which components C) and D) are reacted with this prepolymer. In this procedure, the prepolymer can be either initially introduced batchwise or prepared continuously in a part of the extruder or in a separate prior prepolymer unit. Components C) and D) can be added to the prepolymer together or separately.

The TPUs prepared in accordance with the invention can optionally be worked further, e.g. by conditioning of the polymer in the form of sheet or blocks, comminution or granulation in shredders or mills, degassing and granulation with melting. Preferably, the polymer is passed through a unit for continuous degassing and extrudate formation. This unit can be e.g. a multi-shaft screw machine (ZSK).

The TPUs of the present invention are preferably employed for the production of injection-molded articles and extruded articles.

As used herein, the term Isocyanate Index (also commonly referred to as the characteristic number) represents the number which is the quotient, multiplied by 100, of the equivalence ratios of the isocyanate groups from component A) and the sum of the Zerewitinoff-active hydrogen atoms of components B), C) and D). The Isocyanate Index of the presently claimed TPUs ranges from about 85 to 120.

The invention is to be illustrated in more detail with the aid of the following examples.

EXAMPLES

The following components were used in the working examples:

| | |
|---|---|
| Terathane ® 1000: | Polyether having a number average molecular weight of $M_n$ of 1,000 g/mol; a commercial product of Du Pont de Nemours |
| Isocyanate: | Methylene-4,4'-(phenyl isocyanate), commonly referred to as MDI |
| Exolit ® OP 560: | Flameproofing agent based on diol-phosphonate, which has Zerewitinoff-active hydrogen atoms; commercially available from Clariant GmbH |
| Exolit ® OP 910: | Flameproofing agent based on phosphonate from Clarient GmbH (without Zerewitinoff-active hydrogen atoms) |
| Levagard ® 4090N: | Flameproofing agent from Bayer AG (OP(OC₂H₅)₂CH₂N(C₂H₄OH)₂) |
| Cyagard RF-1243: | Flameproofing agent based on diol-phosphine oxide from Cytec, Inc. |
| BDO: | 1,4-Butanediol |
| Irganox ® 1010: | Tetrakis(methylene-(3,5-di-tert-butyl 4-hydroxycinnamate))-methane from Ciba Specialty Chemicals Inc. |
| Licowax ® C: | Ethylene-bis-stearylamide, a commercially available release agent from Clariant Würtz GmbH |

Example 1 (Comparison Example)

Example 1 of EP-B 0 617 079 was reworked. In this example a TPU shaped article with a Shore A hardness of 85 which was built up from polyoxymethylene glycol having a number-average molecular weight of 1,000, MDI and BDO at a temperature of approx. 180° C. was produced by the belt process. 25 wt. % melamine cyanurate and 4 wt. % phosphoric acid 1,3-phenylene-tetraxylenyl ester were added as flameproofing agents.

The results can be seen from the table.

Example 2 (Comparison Example)

A mixture of 1,159 g Terathane® 1000, 139 g BDO, 200 g Exolit® OP 910, 7 g Irganox® 1010 and 10 g Licowax® C. was heated up to 160° C., while stirring with a blade stirrer at a speed of 500 revolutions per minute (rpm), after which 684 g MDI were added. The mixture was then stirred for 110 s, after which the TPU was poured out. Finally, the material was after-treated for 30 min at 80° C.

The finished TPU was cut, granulated and injection molded to test specimens, after which the tensile strength, blooming properties, shrinkage and UL test were determined. The results of these measurements can be seen from the table.

Example 3 (Comparison Example)

A mixture of 1,045 g Terathane® 1000, 125 g BDO, 100 g Exolit® OP 560, 6.3 g Irganox® 1010 and 10 g Licowax® C. was heated up to 160° C., while stirring with a blade stirrer at a speed of 500 rpm, after which 713 g MDI were added. The mixture was then stirred for 110 s, after which the TPU was poured out. Finally, the material was after-treated for 30 min at 80° C.

The finished TPU was cut, granulated and injection molded to test specimens, after which the tensile strength, shrinkage, blooming properties and UL-94V test were determined. The results of these measurements can be seen from the table.

Example 4 (Comparison Example)

A mixture of 1,045 g Terathane® 1000, 100 g Exolit® OP 560, 6.3 g Irganox® 1010 and 10 g Licowax® C. was heated up to 160° C., while stirring with a blade stirrer at a speed of 500 rpm, after which 713 g MDI were added. After the maximum reaction temperature was reached, the mixture was subsequently stirred for 30 s, after which 125 g BDO were added. The mixture was then stirred for 100 s, after which the TPU was poured out. Finally, the material was after-treated for 30 min at 80° C.

The finished TPU was cut, granulated and injection molded to test specimens, after which the tensile strength, shrinkage, blooming properties and UL test were determined. The results of these measurements can be seen from the table.

Example 5 (According to the Invention)

A mixture of 1,045 g Terathane® 1000, 6.3 g Irganox® 1010 and 10 g Licowax® C. was heated up to 160° C., while stirring with a blade stirrer at a speed of 500 rpm, after which 713 g MDI were added. After the maximum reaction temperature was reached, the mixture was subsequently stirred for 30 s, after which 125 g BDO and 100 g Exolit® OP 560 were added. The mixture was then stirred for 100 s, after which the TPU was poured out. Finally, the material was after-treated for 30 min at 80° C.

The finished TPU was cut, granulated and injection molded to test specimens, after which the tensile strength, blooming properties, shrinkage and UL test were determined. The results of these measurements can be seen from the table.

Example 6 (According to the Invention)

A mixture of 1,045 g Terathane® 1000, 6.3 g Irganox® 1010 and 10 g Licowax® C. was heated up to 160° C., while stirring with a blade stirrer at a speed of 500 rpm, after which 795 g MDI were added. After the maximum reaction temperature was reached, the mixture was subsequently stirred for 30 s, after which 125 g BDO and 220 g Exolit® OP 560 were added. The mixture was then stirred for 100 s, after which the TPU was poured out. Finally, the material was after-treated for 30 min. at 80° C.

The finished TPU was cut, granulated and injection molded to test specimens, after which the tensile strength, blooming properties, shrinkage and UL test were determined. The results of these measurements can be seen from the table.

Example 7 (According to the Invention)

A mixture of 1,045 g Terathane® 1000, 6.3 g Irganox® 1010 and 10 g Licowax® C. was heated up to 160° C., while stirring with a black stirrer at a speed of 500 rpm, after which 686 g MDI were added. After the maximum reaction temperature was reached, the mixture was subsequently stirred for 30 s, after which 125 g BDO and 80 g Cyagard® RF-1243 were added. The mixture was then stirred for 100 s, after which the TPU was poured out. Finally, the material was after-treated for 30 min. at 80° C.

The finished TPU was cut, granulated and injection molded to test specimens, after which the tensile strength, blooming properties, shrinkage and UL test were determined. The results of these measurements can be seen from the table.

Example 8 (Comparison Example; DE-C 25 20 180)

A mixture of 1,000 g Terathane® 1000, 119 g BDO, 23 g Levagard® 4090N, 6 g Irganox® 1010 and 9 g Licowax® C. was heated up to 160° C., while stirring with a blade stirrer at a speed of 500 rpm, after which 615 g MDI were added. The mixture was then stirred for 110 s, after which the TPU was poured out. Finally, the material was after-treated for 30 min at 80° C.

The finished TPU was cut, granulated and injection molded to test specimens, after which the tensile strength, blooming properties, shrinkage and UL test were determined. The results of these measurements can be seen from the table.

Example 9 (Comparison Example; DE-C 25 20 180)

A mixture of 1,000 g Terathane® 1000, 23 g Levagard® 4090N, 6 g Irganox® 1010 and 9 g Licowax® C. was heated up to 160° C., while stirring with a blade stirrer at a speed of 500 rpm, after which 615 g MDI were added. After the maximum temperature was reached, the mixture was subsequently stirred for 30 s, after which 119 g BDO were added. The mixture was then stirred for 100 s, after which the TPU was poured out. Finally, the material was after-treated for 30 min at 80° C.

The finished TPU was cut, granulated and injection molded to test specimens, after which the tensile strength, blooming properties, shrinkage and UL test were determined. The results of these measurements can be seen from the table.

Example 10 (According to the Invention)

A mixture of 1,045 g Terathane® 1000, 80 g Exolit® OP 910, 6.3 g Irganox® 1010 and 10 g Licowax® C. was heated up to 160° C., while stirring with a blade stirrer at a speed of 500 rpm, after which 600 g MDI were added. After the maximum reaction temperature was reached, the mixture was subsequently stirred for 30 s, after which 125 g BDO and 60 g Exolit® OP 560 were added. The mixture was then stirred for 100 s, after which the TPU was poured out. Finally, the material was after-treated for 30 min at 80° C.

The finished TPU was cut, granulated and injection molded to test specimens, after which the tensile strength, blooming properties, shrinkage and UL test were determined. The results of these measurements can be seen from the table.

Determination of the Tensile Strength:

The tensile strength was determined in accordance with the standard EN ISO 527-3 with a test specimen type 5 with a thickness of 2 mm at a tensioning speed of 200 mm/min.

Determination of the Shrinkage:

The after-shrinkage in length was determined as the shrinkage in accordance with DIN 53 464 on injection-molded sheets with the following dimensions:

2.0 mm thickness, 51.96 mm width and 128 mm length.

After being injection molded on an injection molding machine, the sheets were stored for 72 hours at room temperature, after which the length of the test specimen was determined. The shrinkage was then determined as follows:

Shrinkage (%)=(length after storage−length before storage)×100%/length before storage Determination of the Blooming Properties:

The blooming properties of the flameproofing agent were determined with the aid of the following test: A test specimen was stored at room temperature at an atmospheric humidity of 80% for one week. The surface of the test specimen was then inspected visually for substances which had bloomed out.

Determination of the Flameproofing Properties:

The flameproofing properties were determined in accordance with UL94 V at a thickness of the test specimen of 3 mm as described in Underwriters Laboratories Inc. Standard of Safety, "Test for Flammability of Plastic Materials for Parts in Devices and Appliances", p. 14 et seq., Northbrook 1998 and J. Triotzsch, "International Plastics Flammability Handbook", p. 346 et seq., Hanser Verlag, Munich 1990. In this test a V-0 rating means non-burning dripping. A product with this rating is therefore designated as flame-resistant. A V-2 rating means burning dripping, i.e. a poor flame resistance

TABLE

| Example | Process | Flame-proofing agent | Tensile strength (MPa) | UL94 V rating (3 mm) | Shrinkage (%) | Blooming properties |
|---|---|---|---|---|---|---|
| 1 (comparison) | belt process | 25% melamine cyanurate 4% phosphate | 25 | V-0 | n.d. | no deposit |
| 2 (comparison) | one-shot | 10% Exolit® OP 910 | 47 | V-0 | 1.5 | heavy deposit, tacky |
| 3 (comparison) | one-shot | 5% Exolit® OP 560 | 51 | V-0 | 7 | no deposit |
| 4 (comparison) | prepolymer from Exolit and Terathane with MDI | 5% Exolit® OP 560 | 49 | V-2 | 3 | no deposit |
| 5 | prepolymer only from Terathane and MDI | 5% Exolit® OP 560 | 53 | V-0 | 2 | no deposit |
| 6 | prepolymer only from Terathane and MDI | 10% Exolit® OP 560 | 50 | V-0 | n.d. | no deposit |
| 7 | prepolymer from Terathane and MDI | 4% Cyagard RF-1243 | 52 | V-0 | 2 | no deposit |
| 8 (comparison) | one-shot | 2% Levagard® 4090N | 45 | V-0 | 6 | no deposit |
| 9 (comparison) | prepolymer from Levagard and Terathane with MDI | 2% Levagard® 4090N | 43 | V-2 | 4 | no deposit |
| 10 | prepolymer only from Terathane and MDI | 3% Exolit® OP 560 4% Exolit® OP 910 | 48 | V-0 | 2 | slight deposit | n.d.: not determined

Flameproofing agents which cannot be built in are employed in comparison Examples 1 and 2. The mechanical properties deteriorate due to the use of melamine cyanurate (tear strength 25 MPa). Blooming of the flameproofing agent is observed in Example 2, which lead to increased tackiness.

When flameproofing agents which can be built in are employed in the one-shot process (see Examples 3 and 8), the desired V-0 rating is indeed achieved, but the products show a high shrinkage.

The use of a flameproofing agent which can be built in with the polyol (component B), in the preparation of the prepolymer (see Examples 4 and 9) leads to distinctly poor flameproofing properties (V-2 rating).

The use of the flameproofing agent Levagard® 4090 N leads according to DE-C 25 20 180 to polyurethane foam with good properties. Whereas, the TPU produced with this flameproofing agent show too high shrinkage.

Examples 5, 6, 7 and 10 (according to the invention) describe the use of the flameproofing agent which can be built in, and results in TPUs having both good flame resistances and low shrinkages simultaneously with a high level of mechanical properties, without blooming.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastically processable polyurethane elastomer (TPU) having a tensile strength of >35 MPa, with shrinkages of <3% and with self-extinguishing properties which comprise the reaction product of:
   (1) a prepolymer containing NCO groups which comprises the reaction product of
      A) at least one organic diisocyanate comprising a diphenylmethane diisocyanate, or a mixture of diphenylmethane diisocyanate and up to 15 mol %, of polyphenyl polymethylene polyisocyanate, and
      B) at least one polyether polyol having on average at least 1.8 and not more than 3.0 Zerewitinoff-active hydrogen atoms and a number-average molecular weight $\overline{M}_n$ of 450 to 10,000;
   with
   (2) an isocyanate-reactive component comprising:
      C) at least one low molecular weight polyol or polyamine having on average at least 1.8 and not more than 3.0 Zerewitinoff-active hydrogen atoms and a number-average molecular weight $\overline{M}_n$ of 60 to 400 as a chain lengthener; and
      D) from 1 to 15 wt. %, based on the total weight of the TPU, of at least one organic phosphorus-containing compound having on average at least 2.0 Zerewitinoff-active hydrogen atoms and a number-average molecular weight $\overline{M}_n$ of 60 to 10,000, wherein said organic phosphorus-containing compound is selected from the group consisting of (1) one or more phosphonates which correspond to the structural formula:

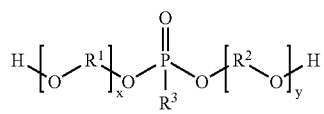

wherein:

R$^1$ and R$^{2:}$ are the same or different, and each independently represents a branched or unbranched alkylene radical having 1 to 24 carbon atoms, a substituted or unsubstituted arylene radical having 6 to 20 carbon atoms, a substituted or unsubstituted aralkylene radical having 6 to 30 carbon atoms, or a substituted or unsubstituted alkarylene radical having 6 to 30 carbon atoms;

R$^3$: represents a hydrogen atom, a branched or unbranched alkyl radical having 1 to 24 carbon atoms, a substituted or unsubstituted aryl radical having 6 to 20 carbon atoms, a substituted or unsubstituted aralkyl radical having 6 to 30 carbon atoms, or a substituted or unsubstituted alkaryl radical having 6 to 30 carbon atoms;

and
x and y each independently represents a number from 1 to 50;
and (2) one or more phosphine oxides which correspond to the structural formula:

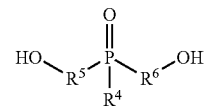

wherein:
R$^4$: represents a hydrogen atom, a branched or unbranched alkyl radical having 1 to 24 carbon atoms, a substituted or unsubstituted aryl radical having 6 to 20 carbon atoms, a substituted or unsubstituted aralkyl radical having 6 to 30 carbon atoms, or a substituted or unsubstituted alkaryl radical having 6 to 30 carbon atoms;
and
R$^5$ and R$^6$: are the same or different, and each independently represents a branched or unbranched alkylene radical having 1 to 24 carbon atoms, a substituted or unsubstituted arylene radical having 6 to 20 carbon atoms, a substituted or unsubstituted aralkylene radical having 6 to 30 carbon atoms, or a substituted or unsubstituted alkarylene radical having 6 to 30 carbon atoms
with the proviso that components C) and D) are different;
and, optionally, in the presence of:
   E) one or more catalysts;
   F) from 0 to 70 wt. %, based on the total weight of the TPU, of at least one further flameproofing agent which contains no Zerewitinoff-active hydrogen atoms and has a number-average molecular weight $\overline{M}_n$ of 60 to 10,000;
   and/or
   G) 0 to 20 wt. %, based on the total weight of the TPU, of further auxiliary substances and additives;
wherein the Isocyanate Index ranges from 85 to 120.

2. A process for the preparation of thermoplastically processable polyurethane elastomers (TPU) with tensile strengths of >35 MPa, with shrinkages of <3% and with self-extinguishing properties, comprising:
   (I) preparing a) a prepolymer containing NCO groups by reacting
      A) at least one organic diisocyanate comprising a diphenylmethane diisocyanate, or a mixture of diphenylmethane diisocyanate and up to 15 mol % polyphenyl polymethylene polyisocyanate,
      with
      B) at least one polyether polyol having on average at least 1.8 and not more than 3.0 Zerewitinoff-active hydrogen atoms and a number-average molecular weight $\overline{M}_n$ of 450 to 10,000;
   (II) reacting a) said prepolymer with b) an isocyanate-reactive component comprising:
      C) at least one low molecular weight polyol or polyamine having on average at least 1.8 and not more than 3.0 Zerewitinoff-active hydrogen atoms and a number-average molecular weight $\overline{M}_n$ of 60 to 400 as a chain lengthener;
      and D) from 1 to 15 wt. %, based on the total weight of the TPU, of at least one organic phosphorus-containing compound having on average at least 2.0 Zerewitinoff-active hydrogen atoms and a number-average molecular weight $\overline{M}_n$ of 60 to 10,000, wherein said organic phosphorus-containing compound is selected from the group consisting of (1) one or more phosphonates which correspond to the structural formula:

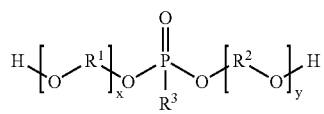

wherein:
R$^1$ and R$^2$: are the same or different, and each independently represents a branched or unbranched alkylene radical having 1 to 24 carbon atoms, a substituted or unsubstituted arylene radical having 6 to 20 carbon atoms, a substituted or unsubstituted aralkylene radical having 6 to 30 carbon atoms, or a substituted or unsubstituted alkarylene radical having 6 to 30 carbon atoms;

R$^3$: represents a hydrogen atom, a branched or unbranched alkyl radical having 1 to 24 carbon atoms, a substituted or unsubstituted aryl radical having 6 to 20 carbon atoms, a substituted or unsubstituted aralkyl radical having 6 to 30 carbon atoms, or a substituted or unsubstituted alkaryl radical having 6 to 30 carbon atoms;

and x and y each independently represents a number from 1 to 50;

and (2) one or more phosphine oxides which correspond to the structural formula:

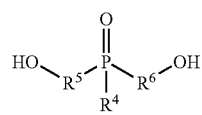

wherein:
R$^4$: represents a hydrogen atom, a branched or unbranched alkyl radical having 1 to 24 carbon atoms, a substituted or unsubstituted aryl radical having 6 to 20 carbon atoms, a substituted or unsubstituted aralkyl radical having 6 to 30 carbon atoms, or a substituted or unsubstituted alkaryl radical having 6 to 30 carbon atoms;

and

R$^5$ and R$^6$: are the same or different, and each independently represents a branched or unbranched alkylene radical having 1 to 24 carbon atoms, a substituted or unsubstituted arylene radical having 6 to 20 carbon atoms, a substituted or unsubstituted aralkylene radical having 6 to 30 carbon atoms, or a substituted or unsubstituted alkarylene radical having 6 to 30 carbon atoms with the proviso that components C) and D) are different;

with steps (I) and (II) optionally being carried out in the presence of

E) one or more catalysts, and optionally with the addition of:

F) 0 to 70 wt. %, based on the total weight of the TPU, of at least one further flameproofing agent which contains no Zerewitinoff-active hydrogen atoms and has a number-average molecular weight $\overline{M}_n$ of 60 to 10,000, and/or G) 0 to 20 wt. %, based on the total amount of TPU, of further auxiliary substances and additives, wherein the Isocyanate Index ranges from 85 to 120.

3. The process of claim 2, wherein the reactive components C) and D) are added simultaneously to the prepolymer.

4. The process of claim 2, wherein component C) is added to the prepolymer first, and then component D) is added.

5. The process of claim 2, wherein component D) is added to the prepolymer first, and then component C) is added.

6. The process of claim 2, wherein C) said low molecular weight polyol comprises ethylene glycol, butanediol, hexanediol, 1,4-di-(beta-hydroxyethyl)-hydroquinone, or 1,4-di-(betahydroxyethyl)bisphenol A.

* * * * *